United States Patent [19]

Nakamura

[11] 4,106,705
[45] Aug. 15, 1978

[54] RESIN MATERIAL RECLAIMING MACHINE

[76] Inventor: Kensaku Nakamura, 272-1, Bessho-Cho, Matsubara, Osaka, Japan, 580

[21] Appl. No.: 784,511

[22] Filed: Apr. 4, 1977

[51] Int. Cl.² ........................................... B02C 23/14
[52] U.S. Cl. ....................................... 241/49; 241/56; 241/74; 241/79.2; 134/65
[58] Field of Search ................. 241/49, 50, 56, 60, 241/74, 79.2; 134/63, 65, 66, 104, 125, 132

[56] References Cited

U.S. PATENT DOCUMENTS

| 573,687 | 12/1896 | McDaniel | 134/65 |
| 654,793 | 7/1900 | Hirt | 134/65 |
| 702,212 | 6/1902 | Higginbottom | 134/65 |
| 871,517 | 11/1907 | McDaniel | 134/65 |
| 2,149,289 | 3/1939 | Hall | 241/49 |
| 3,960,334 | 6/1976 | Wudyka | 241/60 |

*Primary Examiner*—Granville Y. Custer, Jr.
*Attorney, Agent, or Firm*—Bacon & Thomas

[57] ABSTRACT

This invention is concerned with a resin material reclaiming machine consisting of a feeding means, dehydrating means and an assorting means thereby to reclaim raw materials of synthetic resin by shredding and cleaning dirty resin or resinated articles used in agricultural pursuits.

2 Claims, 9 Drawing Figures

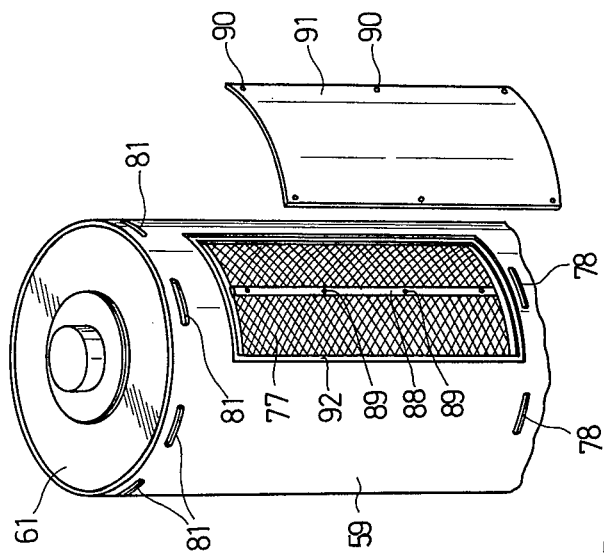
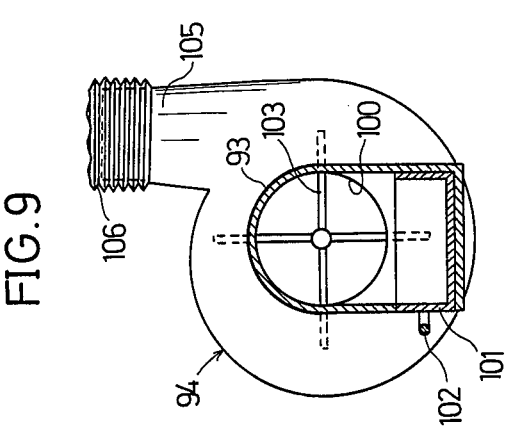
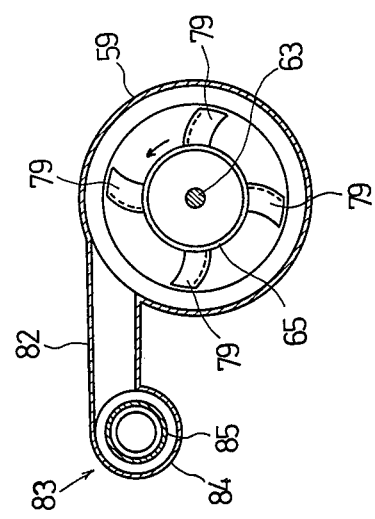
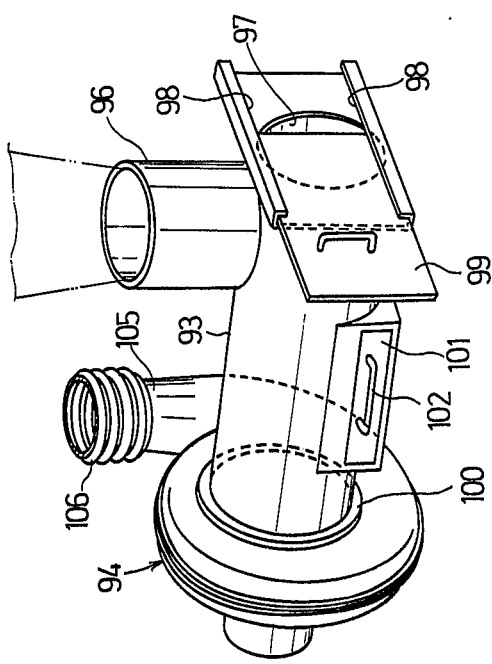
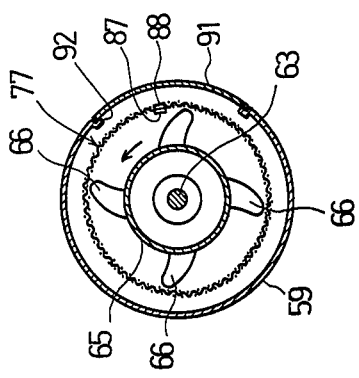

RESIN MATERIAL RECLAIMING MACHINE

The present invention relates generally to improvements in a reclaiming machine for regenerating resin materials, and more particularly to a machine for cleaning and dehydrating waste synthetic resin or resinated articles such for example as resin sheets muddied in agricultural pursuits, unuseful vinyl coverings fo growth forcing houses and beds, or drenched resin pellets of no practical use, whereby independent resin materials are reclaimed.

According to most of the conventional reclaiming machines employable for the above-mentioned purpose, it is observed that grain shape resin articles having a heavy weight over a certain degree can be repulsed out by each blade of an impeller of the machine with which they are forcibly fed into contact so that they are successfully made to bump against a cylindrical filter to be completely dehydrated and finally discharged outwards through an outlet by means of an outlet impeller provided on an upper end of the machine; However, it is also observed that when a lump of small, light-weight strips formed by cutting a resin sheet is treated in the machine, each strip cannot be strongly projected toward the side-wall of the cylindrical casing subject to the upwardly acting wind pressure of the impeller and the absorption force of the outlet impeller so that the strips are brought up to the upper end of the casing withoug being fully dehydrated, they become entangled with each blade of the outlet impeller and/or forced upwardly to block the outlet since said impeller, when rotating, discharges the inner air to the outside and further the air pressure in the cylindrical casing is made lower than the ambient air pressure.

Accordingly, the present invention has been made to eliminate the above-mentioned drawbacks and disadvantages and has for one of its main objects the provision of a machine capable of fully dehydrating cut or shredded pieces of resin sheets, or drenched resin pellets, by subjecting them to the centrifugal separation force of an impeller.

Another object of the invention is to provide a machine capable of cleaning and dehydrating waste resin articles such as badly muddied farming sheets including vinyl sheet covering of forcing houses and beds thereby providing raw resin materials for reuse.

Another object of the invention is to provide a machine capable of fully dehydrating the aforesaid strips of resin sheets as well as pellet shape resin articles and at the same time smoothyl discharging the same without permitting them to clog the upper end of said casing.

Another object of the invention is to provide a machine capable of drying the dehydrated resin stips or articles as desired through means of a plurality of second dehydrating machines each consisting of a centrufugal blower and a cyclone separator.

A further object of the invention is to provide a machine capable of automatically assorting foreign matter such as small stones and nails from said resin articles by their own specific gravity when being descinated.

A still object of the invention is to provide a machine capable of continuously cutting said resin sheets into small strips or pieces, cleaning and dehydrating the same and finally drying the same.

These and other objects, features and advantages of the invention will become apparent from the following detailed description of the invention in conjunction with the accompanying drawings, in which:

FIG. 4 is a sectional view taken on the line 1 — 1 of FIG. 3;

FIG. 5 is a sectional view taken on the line 2 — 2 of FIG. 3;

FIG. 6 is a perspective view partially showing elemental portions of the dehydrating means;

FIG. 8 is a perpesctive view especially showing the lowermost end of said assorting means; and FIG. 9 is a cross section elevational view taken on the line 3 — 3 of FIG. 7.

Figure 1:
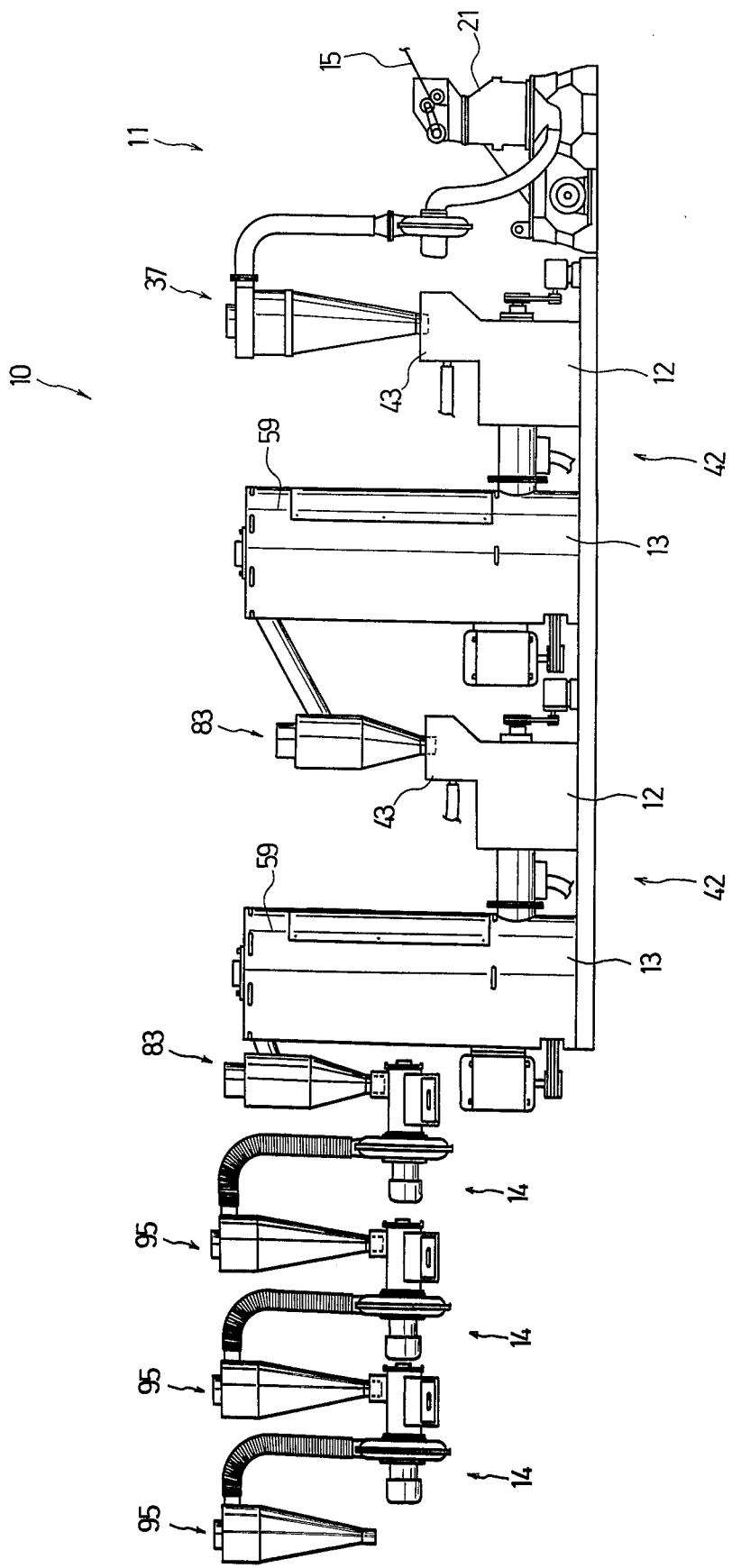
FIG. 1 is a front elevational view showing a resin article reclaiming machine embodying the invention.

Setting forth now in detail the waste resin or resinated article reclaiming machine of the present invention with reference to the accompanying drawings, wherein especially in FIG. 1 reference numeral 10 generally designates a main body of waste resin or resinated article reclaiming machine. Said main body 10 comprises a shreding means 11, a cleaning means 12, a dehydrating means 13 and an assorting means 14.

Figure 2:
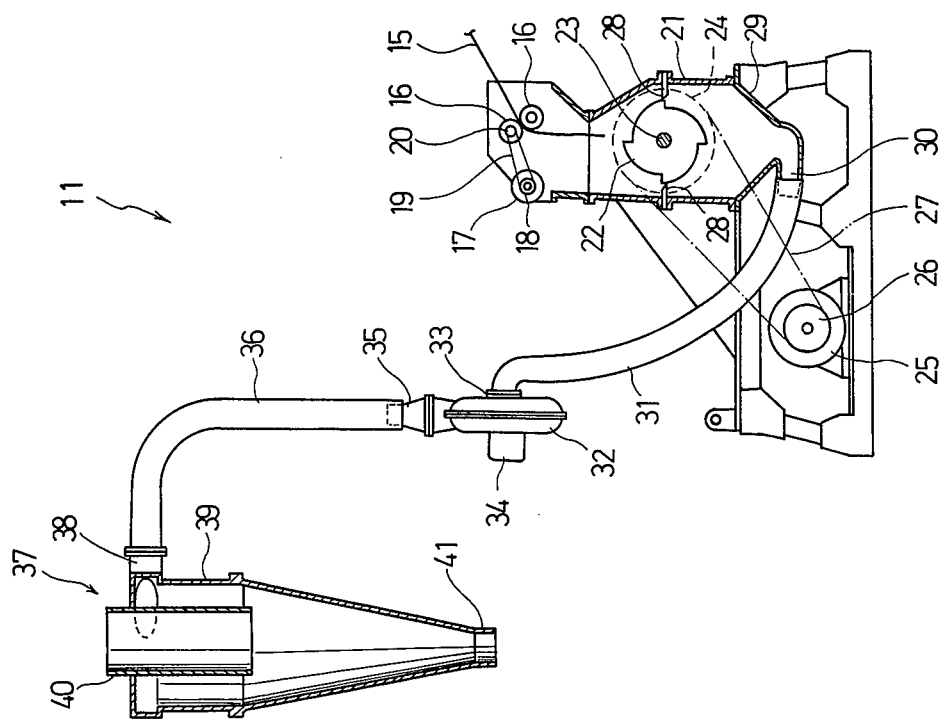
FIG. 2 is a cross section elevational view showing a shredding means of the machine adapted to shred said resin materials.

Of the above-mentioned means, said shredding means 11 is adapted to shred to pieces a vinyl sheet or polyethelene sheet 15 soiled with mud in cultivation of land. As is also shown in FIG. 2 of the accompanying drawings, said shredding means 11 has a pair of rollers 16 provided thereon in oppoesed relation with one another, one of which is driven by means of a first motor 17 through a pulley 18, a driving belt 19 and a pulley 20 thereby to feed said resin sheet 15 downwardly.

Below rollers 16 is a shredding blade 22 enclosed with a side wall 21 and provided with a pulley 24 fixed on one end of a rotary shaft 23 thereof. Between said first pulley 24 and a second pulley 26 on motor 25 is stretched a driving belt 27 in such a manner that the shredding blade 22 is rotated by means of the second motor 25 in a direction wherein said resin sheet 15 is to be shredded to pieces. Said resin sheet 15 is shredded between the blade 22 and a receiving blade 28.

The lower portion of said side wall 22 has a wall surface area 29 which is tapered toward its lowermost end and formed in this end with a feeding outlet 30 to which there is connected the lower end of a duct 31 with its upper end connected to a central absorption mouth 33 of a feeding fan 32. Said fan 32 is directly connected to a motor 34 so as to be rotated thereby. To an outlet 35 of the fan 32 there is connected the lower end of a feeding duct 36 with its upper end connected to a feeding mouth 38 of a cyclone separator 37 whereby shredded pieces of said resin sheet 15 are fed through said feeding fan 32 to be discharged into said cyclone separator 37.

Said cyclone separator 37 has an outer cylindrical wall 39 provided in its center with a cylindrical exhaust pipe 40, said wall 39 being tapered toward its lowermost end to form an outlet 41. Thus the shredded pieces of resin sheet 15 fed through the fan 32 are moved along the inner wall surface area of the outer cylindrical wall 39 and discharged downwardly through the outlet 41 while the air stream in the wall 39 is exhausted outwardly through the exhaust pipe 40.

Said cleaning means 12 and said dehydrating means 13 are coupled to one another thereby to form a single unit of cleaning and dehydrating means 42 in such a manner that a couple of said units 42 are connected in sequence to a following couple of units 42.

Figure 3:
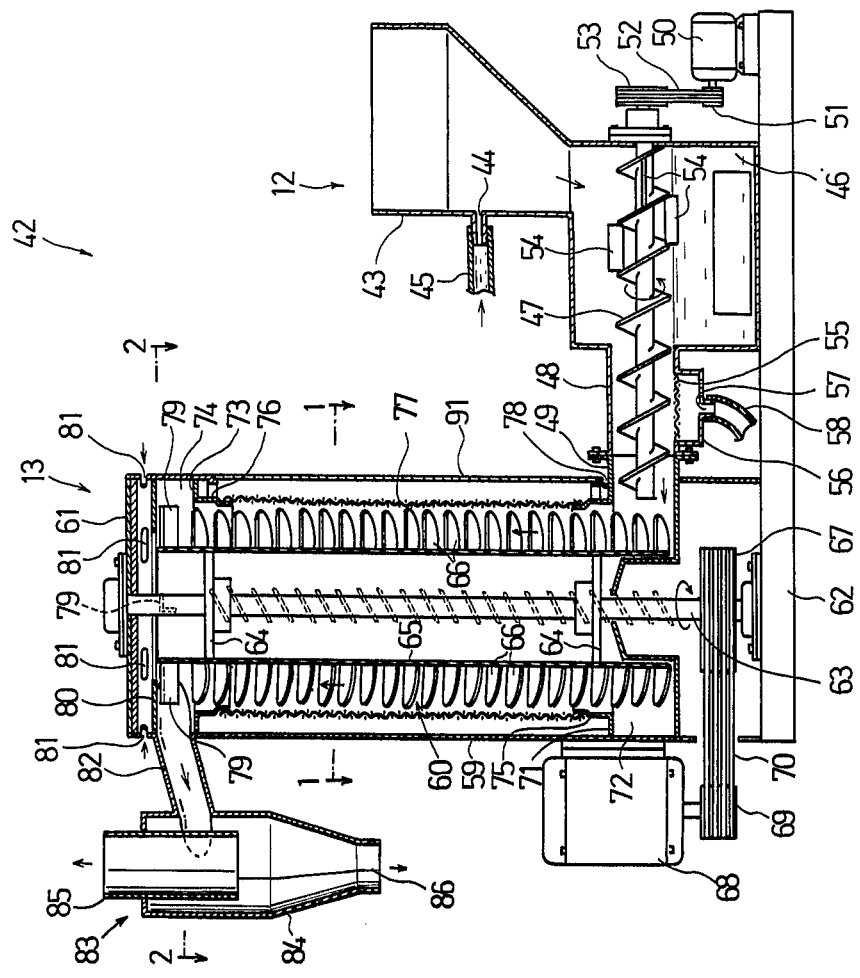
FIG. 3 is a cross section elevational view showing cleaning and dehydrating means of the machine adapted to clean and dehydrate smashed pieces of resin articles.

In FIG. 3 of the accompanying drawings are shown said couple of units 42 wherein said cleaning means 12 is provided with a hopper 43 for receiving said shredded pieces of resin articles 15 fed through said cyclone separator 37 of the shredding means 11. Said hopper 43 is provided with a water feeding port 44 to which is coupled a duct 45 communicated with a suitable cleaning water source so that the pieces of resin sheet 15 are mingled with the cleaning water. In the lower portion of said hopper 43 a cleaning bath 46 is provided having a screw conveyor 47 whose free end is disposed to face a feeding port 49 of the dehyrating means 13 through a cylindrical portion 48.

Said screw conveyor 47 is adapted to be driven by means of a third motor 50 through a pulley 51, a driving belt 52 and a pulley 53, having a plurality of agitating members 54 fixed around the inner peripheral surface area of the cleaning bath 46. Thus a quantity of said shredded pieces 15 fed into the bath 46 together with cleaning water are agitated by said agitating memers 54 to be fed into said cylindrical portion 48 for a following treatment.

Said cylindrical portion 48 has a mesh netting 55 stretched below the lower portion thereof, with a receiving vessel 56 disposed below the mesh netting 55 and formed with an outlet 57 to which is connected a drainpipe 58. Inasmuch as the shredded pieces of resin sheet 15 and cleaning water fed from the cleaning bath 48 are fed to said cylindrical portion 48, a quantity of water that has cleaned the shredded pieces 15 and become foul itself is drained off from said outlet 57. This results in said feeding port 49 of the dehydrating means 13 is supplied with the shredded pieces of resin sheet 15 and dirty matters that have not gone through the mesh netting 55.

The dehydrating means 13 has a cylindrical body 59 provided internally with an impeller 60 that comprises a rotary shaft 63 rotatably supported on an upper wall 61 and a base 62, a drum 65 rigidly fixed on the shaft 63 between supporting plates 64, and a plurality of impellers 66 rigidly fixed on the periphery of the drum 65.

Said rotary shaft 63 has a pulley 67 fixed in the lowermost end thereof and is driven through a pulley 69 and a driving belt 70 by means of a fourth motor 68 fixed on the outer periphery of said cylindrical body 59. In the lower portion of said cylindrical body 59 a feeding chamber 72 formed with a bulkhead while the upper portion has an exhaust chamber 74 formed with a hulkhead 73 in such a manner that these two chambers 72 and 74 define a passage through in the center thereof so as to permit said impeller 60 to be normally disposed therein. To said feeding chamber 72 there is connected said feeding port 49.

Said two bulkheads 71 and 73 are provided on their opposed edges with vertical flanges 75, 76 mounted in aligned relation with one another, a mesh netting 77 being stretched between and secured on said flanges 75, 76 to form a cylindrical shape.

Each blade 66 of said impeller 60 is oblique to the axis and peripheral surface of the drum 65, as is clearly shown in FIG. 4 of the accompanying drawings. Each front edge of said blade 66 disposed in its rotational direction has a sweep back angle and is formed in its free end as a circular arc. Thus by the high speed rotation of the impeller 60, the shredded pieces of resin sheet 15 fed into the feeding chamber 72 are forcibly sent flying to the exhaust chamber 74 with a strong centrifugal force and are completely dehydrated on the way to the latter chamber 74.

A quantity of water dehydrated from the shredded pieces 15 passes through the mesh netting 77, flung at the inner peripheral wall of the cylindrical body 59 and, while running down along the same wall, discharged outwardly of the body 59 through the outlet 78 formed in a portion of the body 59 where the bulkhead 71 is positioned.

Each blade 66 of the impeller 60 has a sweep back angle with respect to the rotational direction of the impeller 60, as has been mentioned above, so that the shredded pieces of resin sheet 15 are prevented from being jammed between the foremost end of each blade 66 and the mesh netting 77, or caught by said foremost end, with the result that the shredded pieces 15 can be fed for a following process of treatment.

The drum 65 disposed in said exhaust chamber 74, as is clearly shown in FIG. 5 of the accompanying drawings, has a plurality of blower plates 79 fixed on the outer periphery thereof, each of the plates 79 being adapted to blow away from the exhaust chamber 74 the shredded pieces 15 that are sent flying upwardly by means of the blades 66 positioned just below. In the position of said exhaust chamber 74 over the blower plates 79 there is provided a bulkhead 80 open at its center and the upper portion of the cylindrical body 59 with respect to said bulkhead 80 is provided peripherally with a plurality of ventilation holes 81 at substantially regularly spaced apart intervals so as to supply the exhaust chamber 74 with air from the direction opposed to the blades 66 of the impeller 60.

Said blades 66 cause an air stream when in rotation and said blower plates 79 also produce an absorption air stream when in rotation so that the shredded pieces of resin sheet 15 having a light weight will be directly blown away to the exhaust chamber 74 without being subjected to the centrifugal force that otherwise can dehydrate the shredded pieces 15. However, by the air supplied through said ventilation holes 81 of the upper cylindrical portion 59, both the absorbing force of said air stream and said absorptive air stream caused by the impelling blades 66 and the blower plates 79 are effectively controlled whereby said shredded pieces 15 can be completely dehydrated under an adequate centrifugal force.

It is to be understood that the ventilation holes 81 are so designed as to permit a desired quantity of air, though not shown in the drawings, by adjusting the opening size of each hole 81.

Said exhaust chamber 74 is communicated through an exhaust pipe 82 to a cyclone separator 83 to which the shredded pieces of resin sheet 15 dehydrated are to be blown. Then the shredded pieces 15 are spun around the inner periphery of the outer wall 84 and the air stream of the impelling blades 66 is exhausted outwardly through the exhaust pipe 85.

While the cyclone separator 83 urges the shredded pieces 15 to spin around the inner periphery of the outer wall 84, the air stream is blown off from the exhaust pipe 85 and the shredded pieces 15 are discharged through the outlet 86 directly downwardly of the cyclone separator 83 thereby separating the air stream from the shredded pieces 15.

As is clearly understood from the foregoing description, the shredded pieces of waste resin sheet 15 fed into the first unit of cleaning and dehydrating means 42 are further fed into the following unit 42 thus being cleaned and dehydrated two times, and thereafter being fed into the assorting means 15. The mesh netting 77 is detachably mounted with respect to the flanges 75 and 76.

As shown in FIGS. 4 and 6 of the accompanying drawings, said mesh netting 77 has a vertical seam or a juncture extending longitudinally of the unit 42, being secured to connecting rods 87, 88 fixed to the flanges 75, 76 by means of screws 89, respectively. A cover 91 is detachably mounted on the portion of the cylindrical body 59 outwardly of said juncture by means of screws 90 so that for cleaning purpose the mesh netting 77 is removable through an opening 92 where said cover 91 is positioned, merely by removing the cover 91 and releasing the fixed connecting rods 87, 88.

According to the present invention, the assorting means 14 are in sets of three connected in sequence so as to repeat the assorting operations three times. However, subject to assorting conditions of the shredded pieces 15 from dirty foreign matters including sand, nails, shavings, and what not, said assorting operations may be effective enough to be made only once or twice.

Figure 7:
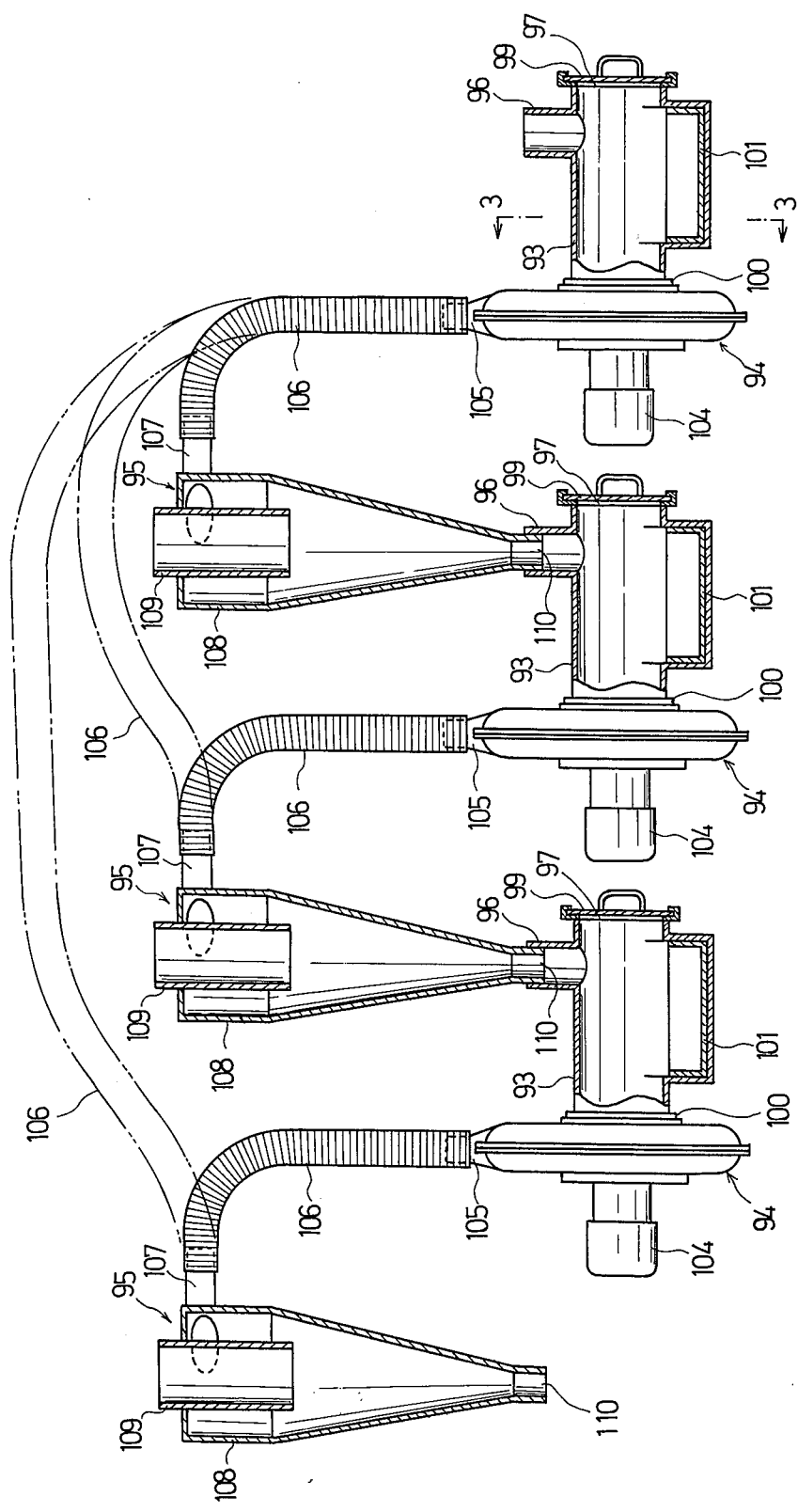
FIG. 7 is a cross section elevational view showing an assorting means for assorting the dehydrated resin pieces.

Each of said assorting means 14 consists of an assorting chamber 93, a blowing fan 94 and a cyclone assorting means 95, as is clearly shown in FIG. 7 of the accompanying drawings.

In FIGS. 8 and 9 show said assorting chamber 93 and said blowing fan 94 provided in one assorting means 14, a feed pipe 96 for receiving the shredded pieces of resin sheet 15 communicates with to one upper end of the assorting chamber 93 and is connected to either of the cyclone assorting means 83 and 95. On one side of the assorting chamber 93 downwardly of said feed pipe 96 is formed an opening 97 wherein there is mounted a damper 99 supported slidably by means of retaining flanges 98.

The quantity of air from the fan 94 having its inlet 100 connected to the other end of said assorting chamber 93 is adjustably controlled by adjusting the open area of the opening 97 of the damper 99.

In the lowermost middle of said assorting chamber 93 a drawer 101 is removably held having its upper portion open to receive foreign matters which are separated from the shredded pieces 15. Said drawer 101 is provided with a knob or handle 102 to be grasped by hand when the drawer 101 is to be drawn out from the chamber 93 in order to dispose of the foreign matters accumulated in the drawer 101.

Each impelling blade 103 of said blowing fan 94 is notatable by a motor 104 directly connected to the fan 94 thereby receiving the shredded pieces of resin sheet 15 fed through the aforesaid feed pipe 96, and discharging the same through an outlet 105.

Since foreign matters such as sand, nails, chips and the like fed into the fan 94 together with the shredded pieces 15 are greater in specific gravity than the pieces 15, they fall into the drawer 101 against or regardless to the absorptive force of the fan 94 in rotation whereas the shredded pieces 15 progress into the fan 94. By adjusting the damper 99 a desired quantity of air is admitted to the fan 94 to sort the foreign matters from the shredded pieces.

As is clearly shown in FIG. 7, the lowermost end of a flexible duct 106 is connected to the outlet 105 of each of fans 94 while the uppermost end is insertibly mounted into a feeding port 107 of said cyclone separator 95 so that the shredded pieces 15 discharged from the fan 94 are transferred along the inner peripheral surface of an outer wall 108 of the cyclone separator 95 and discharged through an outlet 110 whereas the air stream is exhausted through an exhaust pipe 109 to the outside.

Since the uppermost end of said each flexible duct 106 is insertibly mounted into the feeding port 107 as has just been mentioned above, the first flexible duct 106 is replaceable with a second or third flexible duct 107 as desired. This has a result that, selective assorting operation is made possible by using either a singularity or plurality of assorting means 14 subject to assorting conditions of the shredded pieces 15.

Though a few specific embodiments of the present invention have been shown and described herein, it will be apparent to those skilled in the art that the invention is not restricted to the details set forth but many changes and modifications may be made without departing from the spirit and scope of the invention as defined in the annexed claims.

What is claimed is:

1. A resin material reclaiming machine comprising an upstanding cylindrical casing having a lower inlet and an upper outlet, a cylindrical filter means housed in said cylindrical casing spaced inwardly therein and extending from said inlet to said outlet, and an impeller means including a plurality of impelling blades rotatably mounted coaxially in said filter means along the axis thereof, being adapted to blow wet pieces of resin material from said inlet upwardly to said outlet thereby to dehydrate said pieces within said filter means during the upward blowing operation of said impeller means, a discharging impeller means mounted on the upper end of said impeller and adapted to discharge said pieces of material to the outside through the outlet of said cylindrical casing, and an air inlet formed in the portion of said cylindrical casing positioned over said discharging impeller, a cyclone separator mounted adjacent the upper portion of said cylindrical casing and in communication with the outlet of said casing, and a plurality of second cleaning means each consisting of a centrifugal blower and a second cyclone separator mounted in communicating relation with said cyclone separator, feed hopper means for said upstanding cylindrical casing mounted on the upper portion of a case having screw conveyor means therein, a feed pipe for supplying cleaning water to said hopper means, and an opening formed in the bottom of said case below said screw conveyor, and a dehydrating mesh netting stretched on said opening.

2. The resin material reclaiming machine, as set forth in claim 1, wherein said second cleaning means further comprises means defining a passageway formed at a substantially right angle extending between its cyclone separator and its centrifugal blower, one leg of said passageway, at said right angle, being open and provided with a damper capable of adjusting the area of said opening.

* * * * *